3,671,124
MICROFILM DUPLICATOR AND METHOD OF
PHOTOCOPYING MICROFILMS
William Amolsch, Detroit, and Robert J. Maher, Farmington, Mich., assignors to Douthitt Corporation, Detroit, Mich.
Filed Sept. 4, 1970, Ser. No. 69,826
Int. Cl. G03b 27/04
U.S. Cl. 355—124
8 Claims

ABSTRACT OF THE DISCLOSURE

An apparatus to simultaneously duplicate a large plurality of microfilm negative material supported on a transparent sheet by ultra-violet photo process in which the apparatus has a glass window which supports the transparent sheet and a photosensitive lamina placed on top of the transparent sheet, an ultra-violet rays emitting device is supported in the lower section of the apparatus which also supports an automatic fast acting shutter mechanism disposed between the ultra-violet ray emitting device and the glass window which supports the microfilm transparency. In the process of photo-copying a cover is displaced over the glass window to keep out sun rays or artificial, external light rays and the space between the cover and the glass window, when the cover is closed, is automatically evacuated of air to tightly press the photosensitive lamina onto the transparent microfilm sheet just prior to opening the shutters, to expose the microfilm negative to the ultra-violet rays for transfer of the image to the photosensitive lamina. The operating mechanisms for the shutter and for evacuating of the protective cover are correlated and provided with suitable controls to function in timed sequence.

BACKGROUND AND SUMMARY OF THE INVENTION

As known in the art, mirofilm technique is widely employed at the present to store a large amount of information (written or pictorial) in a relatively small space for future references. Thus, hundreds of pages of manuscrips, records, publications, etc., which otherwise when bound in normal size would comprise several volumes, can be microfilmed and thus stored in a relatively small space, many times smaller than the space that would have to be occupied by the original documents.

In reviewing microfilm records, the microfilmed material is passed through a viewer which is provided with illuminating lights and adequately enlarges the microfilm images for easy reading of the microfilm records.

Very often the necessity occurs that photo-copies of microfilmed negatives have to be made, which hitherto involved complicated, time consuming and costly processes and not at all assured that every minute detail of the microfilmed material would be correctly transferred to the photocopy, due to the minute size of the details and the inability of assuring full surface contact of all areas of the superimposed sheets during exposure, necessary to clearly transfer every image from one sheet to the other.

Obviously, commonly employed office type photocopying processes and apparatuses, which more correctly are photo-printing devices, are not at all suitable to exactly copy microfilmed material. These known photo-printing devices are only adaptable to copy normal size type written or pictorial material and are not efficient to clearly transfer every minute detail from the original to the photocopy, as is well known.

Accordingly, the present invention provides an improved photocopy duplicator for microfilmed material to photocopy a plurality of microfilmed pages of negatives supported on a transparent sheet which is then exposed at intervals to intense ultra-violet light rays for exposing the negatives on the transparent sheet and transfer the images to a photosensitive lamina applied over the transparent sheet.

The top of the present improved apparatus is provided with a glass bed or window retained in a flat frame. The glass window is provided with a plurality of longitudinal slots cut in the glass by means of sand blasting or the like to receive a flange of the transparent sheet to support the microfilm transparency flat on the glass window. A photosensitive lamina is then applied over the transparency or micro-fiche, and the window is covered by a canvas or laminated blanket which is retained in a rectangular frame which has an elastic sealing surface for circumferential sealing abutment around the flat frame of the glass window. A fluid fitting is provided adjacent the hinge connection of the cover which is connected by a conduit to a vacuum pump within the apparatus which, after closing of the cover over the glass window, is actuated to evacuate the space between the cover and the window so as to seal the cover circumferentially around the window and to retain the photosensitive lamina and the transparent sheet in tight surface contact.

Within the apparatus a shutter is provided below the window consisting of oppositely movable slides actuated by fluid power from the vacuum pump and adapted to intermittently expose a lens disposed below the shutters.

In the bottom of the apparatus a high intensity source of ultra-violet light rays is provided which has reflector for the reflection of the ultra-violet rays through the lens, when the shutters are opened, and onto the glass window from underneath to expose the transparency which carries a plurality of microfilmed pages to thereby transfer the images to the photosensitive lamina disposed over the transparency and which is retained on the transparency in tight, complete surface contact by means of the vacuum in the space between the closed cover and the glass window.

Additionally, a blower means is provided which is intermittently actuated to cool the high intensity ultra-violet light source to prevent over-heating of the light source.

Additional features and distinguished advantages of the present improved microfilm duplicator for phtoocopying microfilmed material will become apparent or particularly be pointed out by reference to the following detailed description in connection with the appended drawings.

BRIEF DESCRIPTION OF THE DRAWINGS

The accompanying drawings illustrate, primarily schematically, a preferred embodiment of the present invention in which.

DESCRIPTION OF THE PREFERRED EMBODIMENT

Figure 1:
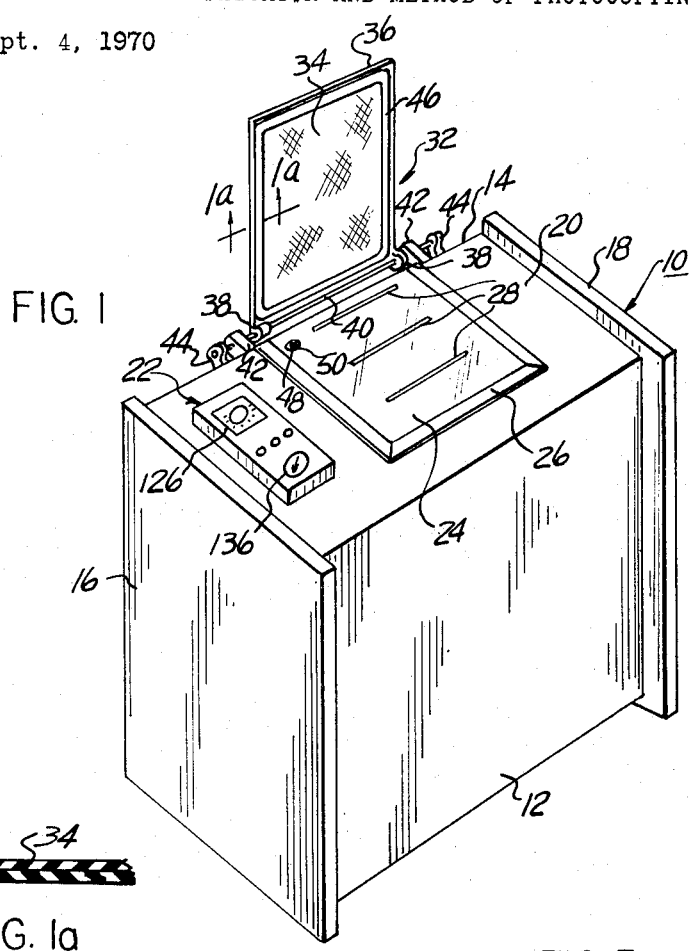
FIG. 1 is a perspective illustration of the assembled apparatus of the present invention, particularly illustrating the transparency supporting glass window and associated cover hinged adjacent thereto.
Figure 2:
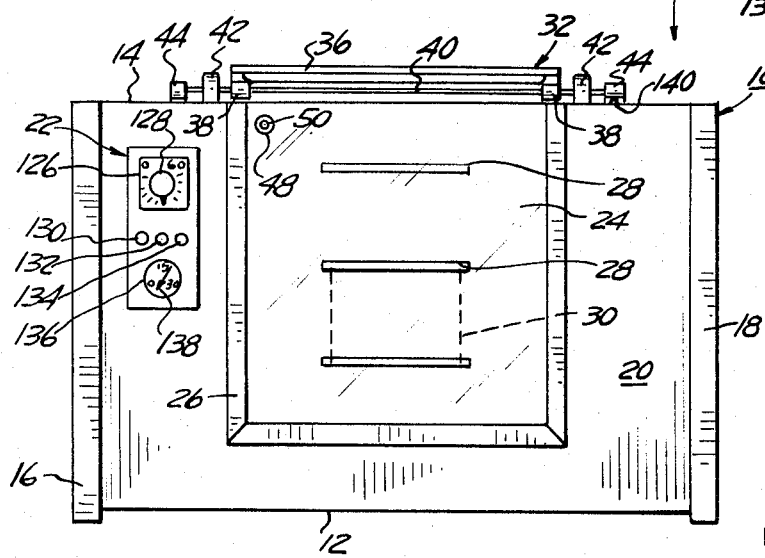
FIG. 2 is a top plan view of the apparatus in FIG. 1.

With particular reference to FIGS. 1 and 2, the present improved apparatus comprises a substantially rectangular housing 10, having a front wall 12, a rear wall 14, opposite disposed sidewalls 16 and 18, respectively, and a substantially flat top 20.

The top 20 supports an electrical control console 22 at one side thereof for electrical operation and timed control of the mechanism of the apparatus, as will be explained further on.

The top 20 also supports a glass bed or window 24 inserted within the top and suitably supported therein by means of a substantially rectangular flat frame 26 which, conveniently may be made of aluminum. The glass window 24 is provided with a series of spaced, parallel longitudinal slots 28, cut therein by means of sand blasting or a similar method, and which are adapted to selectively support a transparent sheet of microfilmed material, indicated at 30 in FIG. 2, which, usually, has a rigid flange along one side thereof (not shown) adapted for insertion into a selected slot 28 to support the transparent sheet of microfilmed material in a flat position on the glass window 24.

Adjacent of the glass window 24 and to the rear thereof, a cover assembly 32 is hinged to the upper edge of the rear wall 14. The cover assembly 32 is composed of a flat rectangular mat 34, preferably made of multiple-ply canvas and rubber laminates or similar material, which is retained in a rectangular rigid frame 36. The opposite lower edges of the frame 36 are provided with hinge members 38 secured to a pivot rod 40 which extends oppositely outwardly therefrom through oppositely disposed bearing support members 42 which are suitably secured to the rear 14 of the apparatus. The opposite outer ends of the pivot rod 40, which extend out of the bearing supports 42, are each provided with a stop member 44 which are secured to the rod to pivot therewith when the cover is closed or opened, and which are adapted to retain the cover 32 in an open, upright position by abutment against the rear 14 of the apparatus.

Figure 1A:
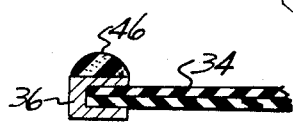
FIG. 1a is an enlarged fractional cross-section through an edge portion of the cover illustrating the sealing arrangement more in detail.

As more particularly shown in FIG. 1a, the rigid frame 36 of the cover assembly 32 is provided with a circumferential sealing rim 46 which is adapted, when the cover 32 is closed, to circumferentially contact the upper surface of the glass window 24 so as to provide a sealed enclosure between the mat 34 of the cover and the upper surface of the glass window 24 for a purpose to be explained hereafter. The peripheral sealing rim 46 is preferably made of a sponge rubber type material and, more in particular, is made of a closed-cell sponge rubber so as to be slightly resiliently compressible into sealing contact against the surface of the glass window 24 when the cover is closed.

Figure 3:
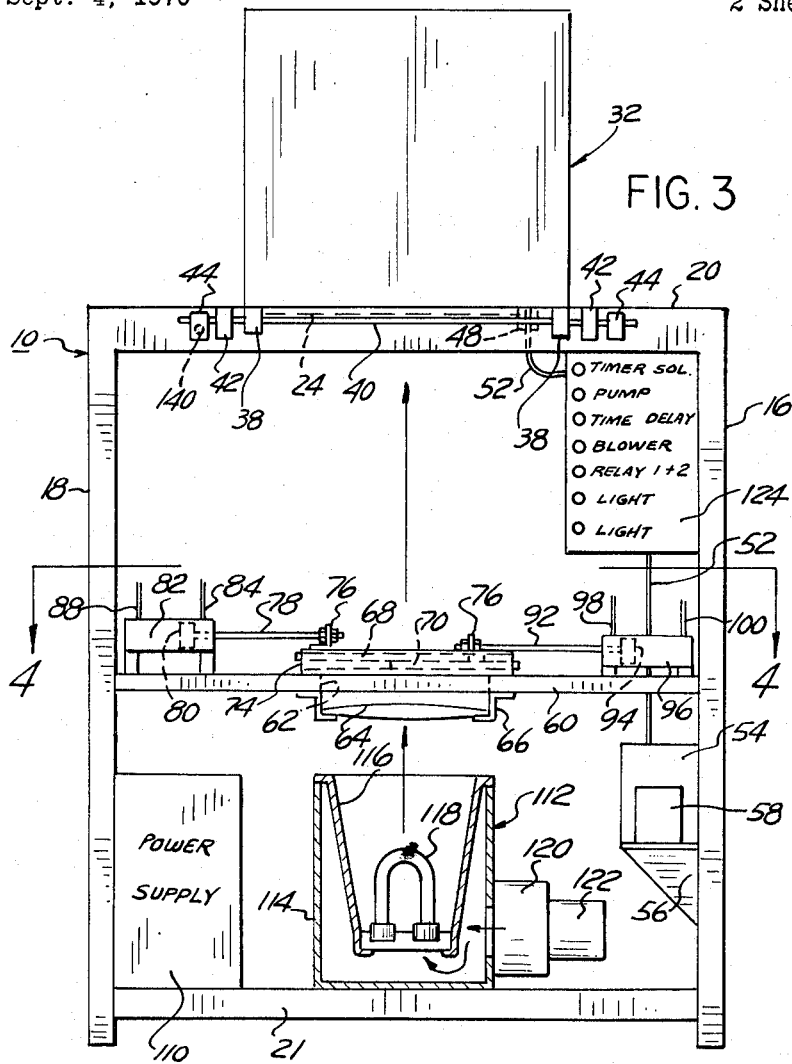
FIG. 3 is a rear view of the apparatus of FIG. 1 with the rear cover being removed for illustration of the interior.

The glass window 24, adjacent one rear edge thereof, is penetrated by a fluid outlet fitting 48 which has an orifice 50 which is open to the surface of the glass window 24. With further reference to FIG. 3, the fluid outlet fitting 48 is connected by means of a conduit 52 to a vacuum pump 54 disposed in the lower portion of the housing 10 and suitably supported on a bracket 56. The vacuum pump 54 is adapted to be intermittently driven by a motor 58 in timed sequence by means of a correlated electro-pneumatic control mechanism of the apparatus, as will be described further on in the description.

Figure 4:
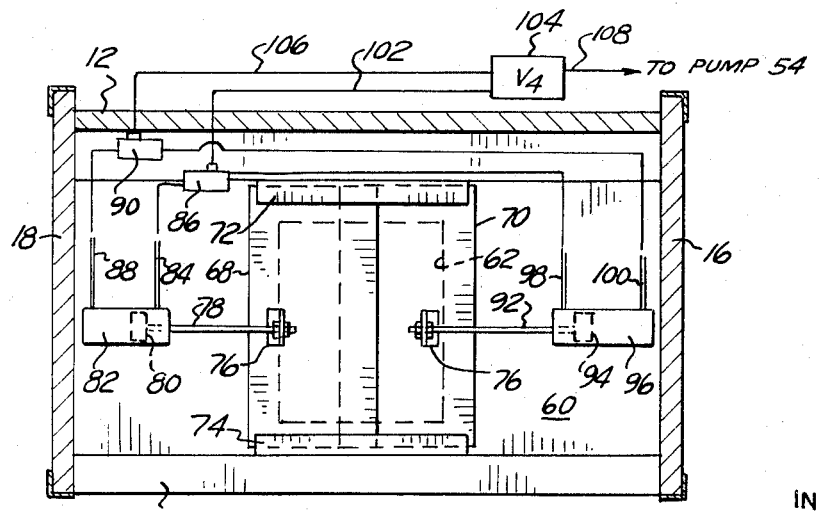
FIG. 4 is a transverse cross-section through the apparatus taken along the line 4—4 in FIG. 3 and illustrating the shutter mechanism in plan view.

With further reference to FIGS. 3 and 4, the apparatus 10 is divided internally by an intermediate support plate 60 parallel to the top 20 and bottom support plate 21. The intermediate support plate 60 is provided with a central aperture 62 below which is located a lens 64 suitably supported by circumferential flange means 66 attached to the underside of the support plate 60 circumferentially around the aperture 62, so that the lens 64 substantially covers the aperture. The lens 64 is of conventional configuration and of a type usually employed in photocopying machines.

The upper end of the aperture 62 is normally closed by a pair of oppositely disposed slidable shutters 68 and 70, respectively, which, in a closed position, as shown in FIGS. 3 and 4, overlap each other at the center of the aperture 62, to thereby close said aperture in an upwardly direction. Each of the opposite outer edges of the shutters 68 and 70 are suitably slidably supported within opposite longitudinal rails 72 and 74, respectively, adjacent the aperture 62 which are fastened to the top of the support plate 60 by any conventional suitable means. Each of the shutters 68 and 70 is provided with a bracket 76 by means of which the shutter 68 is connected to the end of a piston rod 78 reciprocably supported by means of a piston 80 within a left-hand vacuum cylinder 82 supported on the support plate 60. The left-hand vacuum cylinder 82 has a front end conduit 84 communicating with the interior of the cylinder in front of the piston 80 and which, at its other end, leads into a T-connector 86. A rear conduit 88 is connected to the vacuum cylinder 82 for communication with the interior of the cylinder behind the piston 80 and its other end is connected to a similar T-connector 90.

The shutter 70, by means of the bracket 76, is likewise connected to the end of a piston rod 92 reciprocably supported by means of a piston 94 within a right-hand vacuum cylinder 96 which is likewise supported on the support plate 60 at the other end thereof and in axial alignment with the cylinder 82. A front end conduit 98 connects the cylinder 96 in front of the piston 94 to the T-connector 86 and a rear end conduit 100 connects the cylinder 96 in rear of the piston 94 to the other T-connector 90 so that both front end conduits 84 and 98 of the respective cylinders 82 and 96 are connected to a common T-connector 86 and both rear end conduits 88 and 100 are similarly connected to a common T-connector 90. The common T-connector 86 is connected by means of a conduit 102 to an outlet of a four-way valve 104 and the other T-connector 90 is likewise suitably connected by a common conduit 106 to the four-way valve 104. The four-way valve 104 is fluidly connected by a single conduit 108 to the vacuum pump 54 of the apparatus for selective operation of the respective shutter cylinders 82 and 96 in timed sequence, as explained hereafter.

The bottom plate 21 of the housing 10 of the apparatus, at one end thereof, supports an electrical power supply 110 for operation of the electrical control circuit and providing a power source for an ultra-violet, high intensity light 112 which operates at approximately 1,500 watts, it being understood that the power supply, indicated at 110, is provided with conventional suitable AC-DC converter and amplifier circuits to power the ultra-violet light 112 in a manner known in the art and which needs no further description.

The ultra-violet light assembly 112 is composed of a shell like housing 114 which is open at the top towards the lens 64. Supported in the shell like housing 114 extending towards the lower end is a vertically upwardly directed reflector shield 116 and centrally disposed therein a filament 118, suitably connected by conduits (not shown) to the power supply 110. The filament 118, when energized by the power supply 110 through actuation of suitable electrical control arrangements, projects, by means of the reflector 116, high intensity ultra-violet light rays upwardly through the lens 64 and, in the instance the shutters 68 and 70 are opened, through the aperture 62 onto the glass window 24 from the bottom thereof.

In order to intermittently cool the high intensity light assembly 112, a blower 120 is provided supported in the lower section of the housing 10 adjacent the lamp housing 114 which blower head is in communication with the interior of the light housing 114 to circulate cooling air around the reflector 116 and filament 118 at timed intervals to prevent over-heating of the device. The blower 120 is operated by a motor 122 which is suitably electrically connected to the electrical power supply 110 by means of an electrical connector manifold 124 (FIG. 3) disposed within the housing 10.

Figure 5:
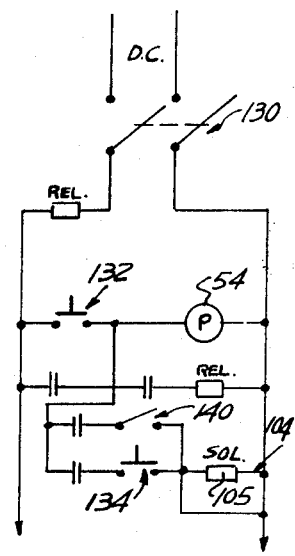
FIG. 5 is a portion of a simplified schematic wiring diagram of an exemplary electrical circuit which may be incorporated in the present apparatus.

The particular electrical control circuit of the present improved, photocopying apparatus forms no part of the present invention and may assume any conventional form, depending primarily on the desired power requirement and operating characteristic of the apparatus, however, for illustrating purpose, the main portion of a simplified electrical circuit has been schematically indicated in FIG. 5.

With reference to FIGS. 2 and 5, the electrical control console 22 located on the top 20 of the apparatus, includes a timer dial 126 having a plurality of indicias for manual setting of the timer control knob 128 at a desired point for operation of the apparatus in the required timed sequence. The control panel 22 further includes a first button 130 designating the main power switch for switching-on power to the apparatus; a second button 132 for switching-on the motor 58 of the vacuum pump 54 and a third button 134 for switching-on the timer 126 after the timer has been pre-set at the designated time sequence. The control panel 22 furthermore preferably includes a vacuum gauge 136 which, by means of a pointer 138, indicates the available magnitude of vacuum necessary for the operation of the apparatus, as will be explained hereinafter. The vacuum employed herein is preferably within the range of 20 to 25 inches mercury.

With reference again to FIGS. 2 and 3, the four-way valve 104 is selectively controlled for operation by means of an electrical actuator such as a solenoid 105 (FIG. 5) which is connected to a safety switch 140 disposed at the rear wall 14 of the apparatus and adapted for actuation by the relative position of the stop 44 connected to the pivot pin 40 of the cover assembly 32. In the open position of the cover assembly 32, the safety switch 140 is maintained in the open position to retain the four-way control valve 104 in a position in which the pump 54 evacuates through the conduits 84 and 98 of the respective shutter cylinders 82 and 96 to maintain the shutters 68 and 70 in a closed position. Until after the cover assembly 32 is closed upon the glass window 24, the safety switch 140 is actuated by movement of the stop 44 away from the switch to close the circuit, to thereby energize the electrical valve actuator 105 (which may be a solenoid) to shift the position of the valve 104 to simultaneously evacuate the shutter cylinders 82 and 96 through the respective near conduits 88 and 100 causing the pistons 80 and 94 to move rearwardly in the cylinders to thereby open the shutters 68 and 70 to permit ultra-violet light rays from the lamp assembly 112 to pass through the lens 64 onto the glass window 24.

Thus the arrangement of the safety switch 140 in co-acting operation with positioning of the cover assembly 32, provides an important safety feature in that it effectively prevents ultra-violet light rays emitting through the glass window 24 prior to complete closing of the cover assembly 32 upon the glass window 24, and sealing of the cover by means of creating a vacuum between the cover the glass window, to thereby positively protect the eyes of the operator of the apparatus against the injurious effects created by exposure to ultra-violet high intensity light rays.

In operation of the present improved apparatus and with continuing reference to FIGS. 2 to 5, the apparatus is started by closing the main power switch by means of depression of the button 130 which connects the electro-pneumatic control mechanism to the power supply 110.

In the initial starting position of the apparatus, which is depicted in FIGS. 3 and 4, the four-way control valve 104 is positioned such, that the pneumatic shutter cylinders 82 and 96 are exhausted through the respective front conduits 84 and 98, retaining the pistons 80 and 94 in the front end of the cylinders, to thereby maintain the shutters 68 and 70 in closed position over the aperture 62. In this position, and by actuation of the main power switch 130, the high intensity haloid lamp 112 is energized at about ½ intensity and at the same time, the blower motor 122 is started to cause the blower 120 to direct cooling air around the reflector 116 and filament 118 of the lamp.

Thereafter, by actuation of the switch button 132, the pump motor is stated to cause operation of the vacuum pump 54 and, starting of the pump motor by means of suitable relays (not shown) causes further energization of the lamp 112 to bring about illumination at full intensity. In this position, although the vacuum pump is operating, repositioning of the four-way valve 104 is still blocked by the open safety switch 140 and air pressure is exhausted through the valve to atmosphere, as will be understood.

Hereafter, the timer control button 132 is depressed which energizes the pre-set timer mechanism 126 to set the operating cycle of the apparatus. However, as long as the cover assembly 32 remains in an open position, as shown in FIGS. 1 to 3, the apparatus cannot be started, thus, the shutters 68 and 70 will not open, to thereby prevent dangerous exposure of high intensity ultra-violet light rays to the operator of the apparatus.

In practice, after all the controls have been actuated as previously described, a transparent sheet 30 which has a plurality of microfilmed material supported thereon (which in instances may be as much as 100 squares of microfilmed pages) is then placed on the glass window 24 with the flange (not shown) of the transparent sheet being inserted in a selected slot 28 to retain the transparent sheet on the glass window. A photosensitive lamina (not shown) such as commonly utilized in photocopying machines, is then placed over the transparent sheet 30 and the cover assembly 32 is closed upon the glass window 24. Closing of the cover assembly 32 causes the following actions to take place: The safety switch 140 is closed by means of pivotal movement of the abutment 44 on the cover hinge pin 40 away from the switch. Closing of the switch causes repositioning of the four-way valve 104 to evacuate the shutter cylinders 82 and 96 through the conduits 88 and 100, respectively, behind the respective pistons 80 and 94 to cause movement of the pistons rearwardly in the cylinders to thereby open the shutters 68 and 70, permitting emission of ultra-violet light rays from the high intensity lamp 112 through the aperture 62 onto the glass surface or window 24. Simultaneously with the energization of the safety switch 140 by closing movement of the cover assembly 32, and upon full closure of the cover assembly upon the glass window 24 so that the circumferential seal 46 abuts upon the glass window, the space between the closed cover and the glass window is being evacuated through the orifice 50 and conduit 52 by means of operation of the vacuum pump 54, to thereby retain maximum complete surface contact between the glass window and the transparent sheet and between the transparent sheet and the photo-sensitive lamina for maximum exposure of all the areas of the superimposed sheets.

The shutters 68 and 70 are operated at intervals of from 5 to 20 seconds and at the end of each exposure interval, the shutters again close, causing the high intensity lamp 112 to turn to half power. The timer at the end of each exposure cycle causes the four-way valve 104 to be repositioned to evacuate the shutter cylinders forwardly of the pistons to cause closure of the shutters. The blower continues to operate for a certain time until the lamp 112 is sufficiently cooled-off, which can be controlled by a suitable time delay in the circuit.

The operating cycle of the apparatus can be repeated again by opening the cover assembly 32, removing the exposed photo-sensitive lamina and placing another photosensitive lamina over the transparent sheet of microfilmed material and, without resetting any of the main controls, the process is repeated by merely closing the cover assembly 32 upon the glass window 24.

It will be obvious from the foregoing description in connection with the appended drawings, that the present invention provides an improved, microfilm photocopying apparatus, having a quick response operating cycle and providing features such as creating a vacuum between the cover and the glass window to cause maximum exposure of all areas of the transparent sheet and the photosensitive lamina disposed thereon.

At the same time, the present improved apparatus embodies an important safety feature, positively preventing operation of the apparatus with the cover in an open position to prevent dangerous exposure of the eyes of an operator to the high intensity ultra-violet light rays.

Although the present invention has been described and shown by means of a preferred embodiment, it will be obvious that various changes in the arrangement and details of the operating mechanism can be made without departing from the spirit and essential characteristics of the invention as defined by the scope of the appended claims.

What is claimed is:

1. In an apparatus for photocopying microfilmed material comprising a housing having a top surface, a glass window disposed in said surface, cover means pivotally supported on said housing adjacent said glass window for movement between an open and a closed position over said glass window, an ultra-violet light source disposed in the bottom section of said housing below said window and in vertical axial alignment therewith, an automatically operated shutter means supported in said housing in interposed relationship between said light source and said glass window; means adapted to stationarily support a transparent sheet on said glass window; said transparent sheet having images imprinted thereon for transfer to a photosensitive lamina superimposed on said transparent sheet; correlated electro-pneumatic operating means for intermittent operation of said light source and said shutter means in response to the position of said cover means relative to said glass window to permit exposure of said transparent sheet on said glass window to said ultra-violet light to transfer said images from said transparent sheet to said photosensitive lamina disposed on said transparent sheet; said electro-pneumatic operating means comprising: an electrical power supply for said light source, a vacuum pump having a motor electrically connected to said power supply; a pair of pneumatic motors fluidly connected to said vacuum pump and operably connected to said shutter means for timed operation of the latter; said cover means comprising: a laminated blanket confined within a rigid frame; a sealing member circumferentially disposed along said frame; suction means associated with said glass window and operably connected to said vacuum pump; said electro-pneumatic operating means further including a timer for intermittent operation of said vacuum pump and said light source operable upon closure of said cover means to (1) evacuate the space between said closed cover means and said glass window to thereby establish maximum surface contact between said transparent sheet, said glass window and said photo-sensitive lamina superimposed on said transparent sheet and (2) to operate said shutter at timed intervals to expose said transparent sheet on said glass window to said ultra-violet light source; a control valve interconnected between said pair of pneumatic motors and said vacuum pump; and an electrical control means associated with said cover means and adapted to operate said control valve operable upon relative movement of said cover means to reposition said control valve to actuate said pair of pneumatic motors to open said shutters when said cover is closed upon said glass window and to again reposition the control valve to actuate said pair of pneumatic motors to close said shutters and retain said shutters in the closed position when said cover means is in an open position.

2. In the apparatus defined in claim 1, the further position of blower means associated with said ultraviolet light source having a motor electrically connected to said power supply, and control means for intermittent operation of said blower motor to cool said ultra-violet light source.

3. In the apparatus of claim 1, said electro-pneumatic operating means further including an electrical control panel embodying said timer adapted to pre-set the operating cycle of said apparatus, a first switch operable between an open and a closed position to connect said ultraviolet light source with said power supply, a second switch operable between an open and a closed position to connect said motor for said vacuum pump to said power supply and a third switch operable between an open and a closed position to energize said timer whereby upon closure of said first switch said ultra-violet light source is energized at approximately half its intensity and said blower motor is turned on; upon closure of said second switch said motor of said vacuum pump is turned on and said ultra-violet light source is turned to full intensity, and closure of said third switch energizes said timer to cause cycling of said apparatus in a timed sequence when said cover means is closed upon said glass window to cause closure of said safety switch for repositioning of said control valve to operate said shutter means and cause said vacuum pump to evacuate the space between said closed cover means and said glass window.

4. In the apparatus as defined in claim 1, said control means comprising: a safety switch connected to said power supply and to said control valve and means connected to said cover to retain said safety switch in an open position when said cover means is in an open position whereby closure of said cover means upon said glass window causes said safety switch to be closed to actuate said control valve.

5. In the apparatus as defined in claim 4, the further provision of blower means associated with said ultraviolet light source having a motor electrically connected to said power supply, and control means for intermittent operation of said blower motor to cool said ultra-violet light source.

6. In the apparatus as defined in claim 5, said electro-pneumatic operating means further including an electrical control panel embodying said timer adapted to pre-set the operating cycle of said apparatus, a first switch operable between an open and a closed position to connect said ultra-violet light source with said power supply, a second switch operable between an open and a closed position to connect said motor for said vacuum pump to said power supply and a third switch operable between an open and a closed position to energize said timer whereby upon closure of said first switch said ultra-violet light source is energized at approximately half its intensity and said blower motor is turned on; upon closure of said second switch said motor of said vacuum pump is turned on and said ultra-violet light source is turned to full intensity, and closure of said third switch energizes said timer to cause cycling of said apparatus in a timed sequence when said cover means is closed upon said glass window to cause closure of said safety switch for repositioning of said control valve to operate said shutter means and cause said vacuum pump to evacuate the space between said closed cover means and said glass window.

7. In the apparatus as defined in claim 1, said source of high intensity light rays comprising a haloid type lamp adapted to emit high intensity ultra-violet rays; and said control means co-acting with said cover means being operable to prevent opening of said shutter means when said cover means is open to thereby effectively prevent dangerous open emission of said ultra-violet rays through said glass window.

8. In the apparatus as defined in claim 1, said glass window being provided with a plurality of longitudinal parallel slots adapted to retain said transparent sheet in a fixed flat position upon said glass window.

References Cited

UNITED STATES PATENTS

| 3,495,905 | 2/1970 | Nielsen | 355—94 X |
| 3,282,177 | 11/1966 | Stanton | 355—10 |
| 287,858 | 11/1883 | Perry | 95—56 |
| 2,481,694 | 9/1949 | Schubert et al. | 355—48 |
| 3,479,121 | 11/1969 | Burgess | 355—84 X |
| 3,185,065 | 5/1965 | Miller | 355—119 |

SAMUEL S. MATTHEWS, Primary Examiner

R. L. MOSES, Assistant Examiner

U.S. Cl. X.R.

355—121